United States Patent
Wells

(10) Patent No.: US 9,010,953 B1
(45) Date of Patent: Apr. 21, 2015

(54) COLOR CHANGING CONTAINER APPARATUS

(71) Applicant: Bright Kingdom Development Ltd., Kowloon (HK)

(72) Inventor: Harold W. Wells, Douglaston, NY (US)

(73) Assignee: Bright Kingdom Development Ltd., Kowloon (HK)

(*) Notice: Subject to any disclaimer, the term of this patent is extended or adjusted under 35 U.S.C. 154(b) by 0 days.

(21) Appl. No.: 14/474,644

(22) Filed: Sep. 2, 2014

(51) Int. Cl.
  *F21V 23/04* (2006.01)
  *F21K 99/00* (2010.01)
  *F21V 33/00* (2006.01)

(52) U.S. Cl.
  CPC .............. *F21V 23/04* (2013.01); *F21K 99/00* (2013.01); *F21K 9/58* (2013.01); *F21V 33/0056* (2013.01); *F21V 33/0036* (2013.01)

(58) Field of Classification Search
  CPC .... F21V 23/04; F21V 33/0056; F21V 33/036
  USPC ................................................... 362/101, 154
  See application file for complete search history.

(56) References Cited

U.S. PATENT DOCUMENTS

| | | | | |
|---|---|---|---|---|
| 2,224,319 | A | * | 12/1940 | Schroyer .................. 362/101 |
| 4,336,574 | A | * | 6/1982 | Goodman .................. 362/101 |
| 5,119,279 | A | * | 6/1992 | Makowsky .................. 362/101 |
| 5,931,558 | A | * | 8/1999 | Chen .................. 362/101 |
| 6,163,248 | A | * | 12/2000 | Paek et al. .................. 362/101 |
| 2003/0081408 | A1 | * | 5/2003 | Tai .................. 362/101 |
| 2013/0259984 | A1 | * | 10/2013 | Eves .................. 362/101 |
| 2014/0226313 | A1 | * | 8/2014 | Yang .................. 362/101 |

* cited by examiner

Primary Examiner — David V Bruce
(74) Attorney, Agent, or Firm — Dilworth & Barrese, LLP.

(57) ABSTRACT

A color changing container apparatus is disclosed. The color changing container apparatus includes a container having an open top, a bottom and a side, and constructed from a material such that substantially all of the container transmits light there-through; and at least one light emitting device attachable to the container to direct light through the container when the container is connected to the at least one light emitting device and providing at least one light color to illuminate the container.

19 Claims, 5 Drawing Sheets

COLOR CHANGING CONTAINER APPARATUS

TECHNICAL FIELD

The present application is directed to a container apparatus having multiple light emitting diodes to illuminate substantially the entire container of the container apparatus and, if included, its contents.

BACKGROUND

Containers that change color are known in the art. Some containers have a temperature sensitive paint which changes color according to the external temperature. For example, such a container can have one color when filled with a cold liquid and a different color when filled with a hot liquid. Other containers have a fluorescent colorant which is of a particular color when exposed to ultraviolet (UV) light. Typically, such conventional color change containers have limited possible colors.

What is needed is a container where the entire color of which, and its contents if included, can be selected from among several colors.

This disclosure describes improvements over these prior art technologies.

SUMMARY

A color changing container apparatus is provided herein, said color changing container apparatus includes a container having an open top, a bottom and a side, and constructed from a material such that substantially all of the container transmits light there-through; and at least one light emitting device attachable to the container to direct light through the container when the container is connected to the at least one light emitting device and providing at least one light color to illuminate the container.

A color changing container apparatus is provided herein, said color changing container apparatus includes a container having an open top, a bottom and a side, and constructed from a material such that substantially all of the container transmits light there-through; a base attachable to the bottom of the container, comprising at least one light emitting device positioned to direct light through the bottom of the container when the container is connected to the base and providing a plurality of user selectable colors; and a plurality of switches for selecting a desired color.

A color changing container apparatus is provided herein, said color changing container apparatus includes a container having an open top, a bottom and a side, and constructed from a material such that substantially all of the container transmits light there-through; a base attachable to the bottom of the container, comprising: a plurality of light emitting devices positioned to direct light from the light emitting devices through the bottom of the container when the container is connected to the base and providing a plurality of user selectable colors; and a plurality of switches for selecting a desired color; and a controller connected to the at least one light emitting device and the plurality of switches for controlling the at least one light emitting device according to inputs received from the plurality of switches.

BRIEF DESCRIPTION OF THE DRAWINGS

The present disclosure will become more readily apparent from the specific description accompanied by the following drawings, in which.

Like reference numerals indicate similar parts throughout the figures.

DETAILED DESCRIPTION OF PREFERRED EMBODIMENT(S)

Figure 1:
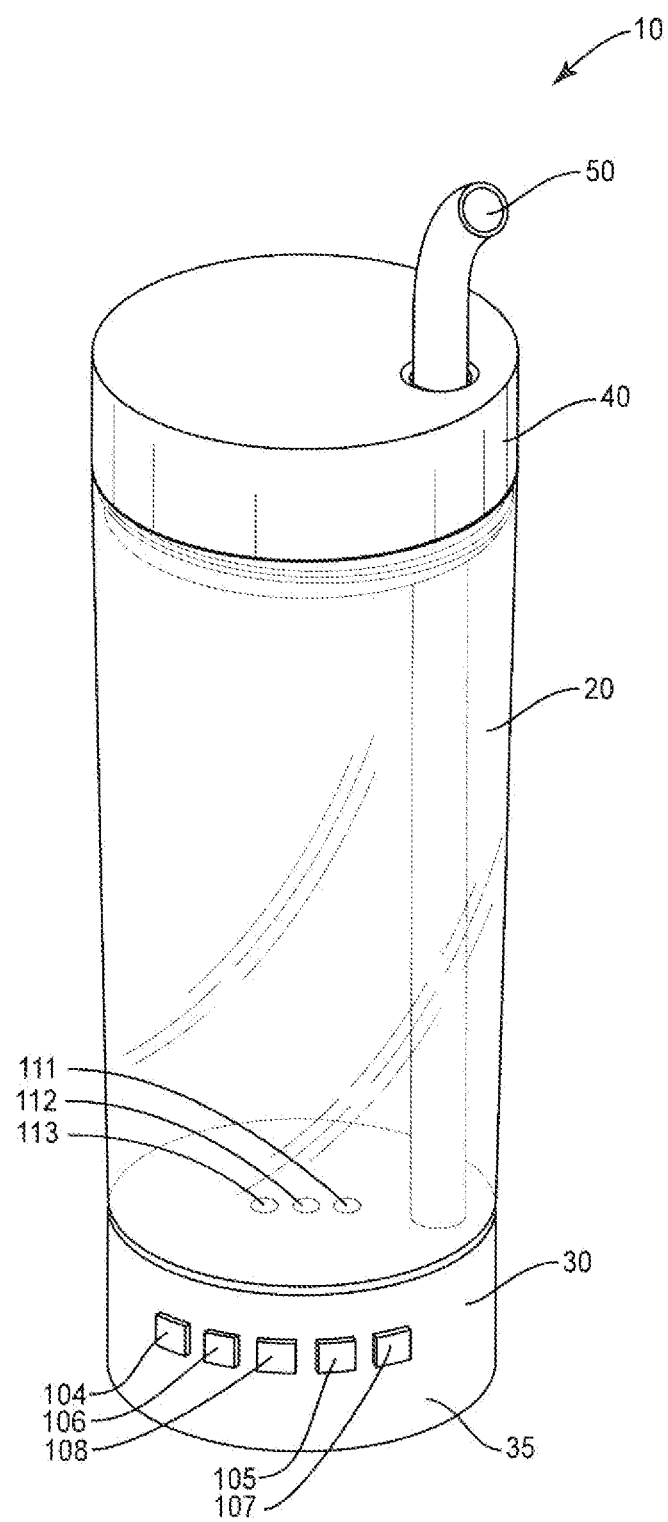
FIG. 1 is a perspective view of a color changing container apparatus according to the present disclosure.
Figure 2:
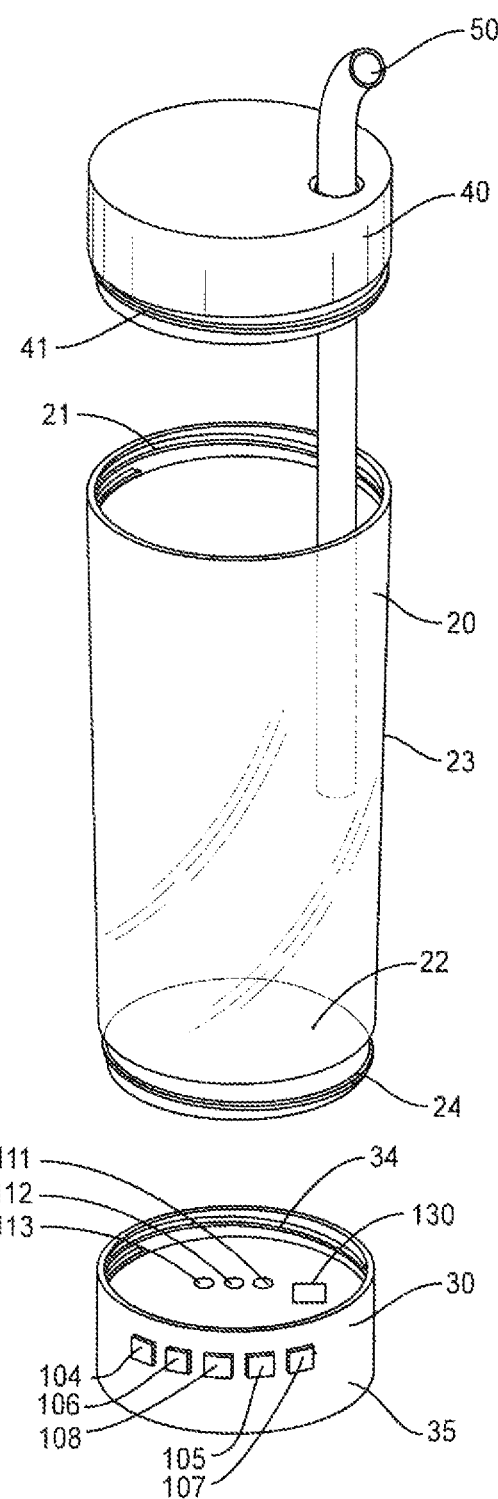
FIG. 2 is an expanded perspective view of a color changing container apparatus according to the present disclosure.
Figure 3:
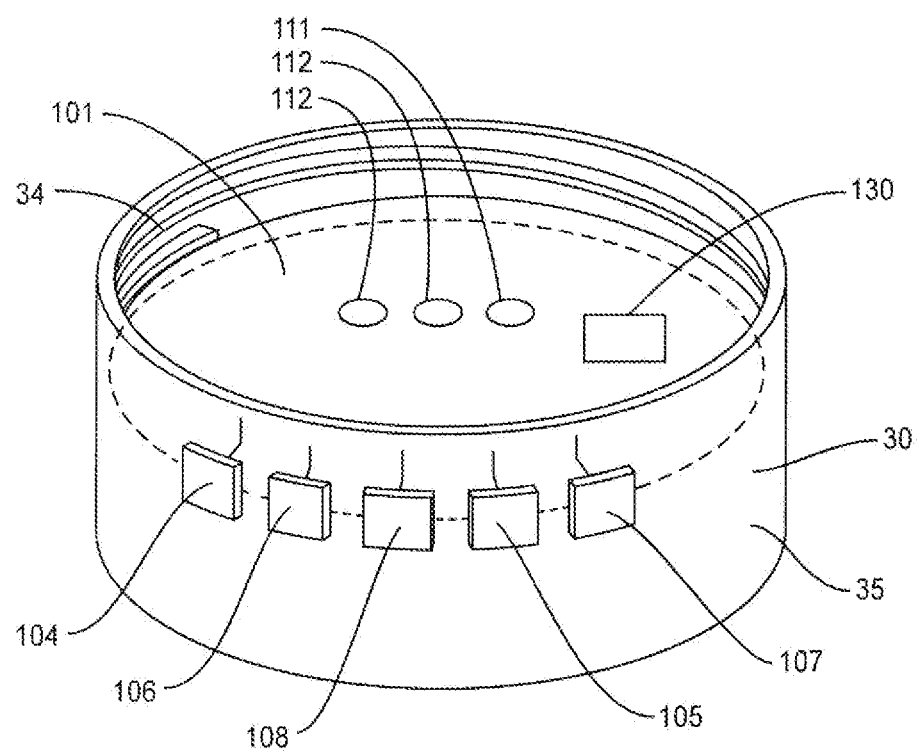
FIG. 3 is a detailed perspective view of a base of a color changing container apparatus according to the present disclosure.

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure.

The present disclosure describes a container that can change color using at least one visible light source. In addition, any liquid contained in the container can also take on the color of the visible light source. Further, the color of the light source can be changeable either by a user or automatically based on preprogramming of a specialized controller. Different patterns of flashing or flickering colors can also be achieved by the present disclosure. The novel color changing container will now be described with respect to the accompanying drawings.

Referring to FIGS. 1-5, a color changing container apparatus 10 according to the present disclosure will now be described. The container apparatus 10 includes a container 20 and a base 30.

Although not a required feature, container apparatus 10 can also include a lid 40, and, as shown, with an optional straw 50. Optional lid 40 is shown connectable to container 20 via threads 21/41; other type of connecting features are contemplated, for example, lid 40 could be connectable to container 20 via a snap seal.

Container 20 includes a bottom 22 and a side 23. Differing shapes and sizes of container 20 are contemplated. For example, container 20 can be fabricated into the shape of a mug with or without side patterning and with a handle. Optionally, container 20 can include graphics and/or indicia (not shown).

Container 20 can be fabricated from any glass or polymeric material suitable for the purposes described herein. A characteristic of the material suitable for container 20 is that bottom 22 and side 23 must be capable of transmitting visible light there-through. For example, polymeric materials suitable for use in the present invention include, but are not limited to, engineering plastics such as high density polyethylene plastic (HDPE), ultra high molecular weight polyethylene plastic (UHMWPE), MC cast nylon 6/66 plastic (Nylon), polytetrafluoroethylene plastic (PTFE), acrylonitrile butadiene styrene (ABS), polycarbonates (PC), polyamides (PA), polybutylene terephthalate (PBT), polyethylene terephthalate (PET), polyphenylene oxide (PPO), polysulphone (PSU), polyetherketone (PEK), polyetheretherketone (PEEK), polyimides, polyphenylene sulfide (PPS), or polyoxymethylene plastic (POM/Acetal).

Base 30 includes switches 104-108, and a circuit board 101 containing light emitting diodes (LEDs) 111-113, and battery 120. As different switches 104-108 are selected LED(s) 111-113 will be connected to battery 120 to provide illumination. The LEDs 111-113 and battery 120 can be included on a single circuit board 101. Base 30 is connectable to container 20 via threads 34/24 respectively. Other connecting features are contemplated. Although described as "connectable" base 30 and container 20 can be connected and even manufactured as a single monolithic piece. If base 30 is connected to container 20, base 30 should be water resistant to allow for suitable cleaning of container apparatus 10.

LEDs 111-113 provide at least three user selectable individual colors. Substantially the entire container 20 is illuminated and acquires the selected color when the individual color light provided by the light emitting device is switched on.

More particularly, the LEDs 111-113 include at least three light emitting devices, each, when actuated, emitting a color specific to the device and different from the colors of the other light emitting devices. A single multi-colored LED is also contemplated. In a preferred embodiment the LEDs comprise a specific light emitting diode for each of at least three different colors. Exemplary colors include, but are not limited to, red, blue, purple, yellow, green etc. Although light emitting diodes are preferred, as an alternative low wattage incandescent light bulbs of different selected colors can be employed as the light emitting devices.

In another embodiment, switches 204-208 can be connected to a specially programmed controller 230 that can control the overall operation of the color changing container apparatus 10. A memory 240 can be included to store various programming to enable controller 230 to vary the light patterns of LEDs 111-113.

Container apparatus 10 includes switches 104-108 associated with base 30. In particular the switches can be, for example push button switches, slide switches, other switches or combinations thereof. In an embodiment, a particular switch itself can be color coded to conform to the light color selected by the switch. The multiple switches 104-108 are disposed on a lateral side 35 of the base 30. In this configuration, switch 104 supplies power to the elements of the circuit. Switch 105 activates one of the light emitting diodes of the multicolor LED device, for example the red light emitting diode. Switch 106 activates a different one of the light emitting diodes of the multicolor LED device, for example the blue light emitting diode. Switch 107 activates a third one of the light emitting diodes of the multicolor LED device, for example the purple light emitting diode. Switch 108 actuates all of the light emitting diodes at the same time.

The three LEDs 111-113 each provide a particular color different from the colors of the other LEDs. Battery 120 provides a power source for operation of the LEDs. Switch 105 controls power to light emitting diode 111. Switch 106 controls power to light emitting diode 112. Switch 107 controls power to light emitting diode 113. Accordingly, when any of the switches 105, 106 or 107 are actuated the container 20 is totally illuminated with the color of the particular LED associated with the corresponding switch.

Switch 108 is preferably a triple pole switch. When actuated, switch 108 provides power to all three LEDs 111, 112 and 113, thereby also providing an additional color which is made up of the combined colors of the three LEDs. In an alternative embodiment, switch 108 provides power to two of the LEDs. Other lighting variations are contemplated.

As described above, container apparatus 10 can also include controller 230, memory 240 and, optionally, speaker S. In this configuration, switch 204 causes controller to activate a light show with multiple flashing light emitting diodes to provide a color light show, optionally with sound effects provided through speaker S. Switch 205 causes controller to activate one of the light emitting diodes of the multicolor LED device, for example the red light emitting diode. Switch 206 causes controller to activate a different one of the light emitting diodes of the multicolor LED device, for example the blue light emitting diode. Switch 207 causes controller to activate a third one of the light emitting diodes of the multicolor LED device, for example the purple light emitting diode. Switch 208 causes controller to activate all of the light emitting diodes at the same time. Other lighting variations are contemplated.

Controller 230 is also connected to a speaker S to provide sound effects stored in memory 240. Controller 230 is programmed to turn on and off the light emitting diodes 111, 112 and 113 in a desired pattern(s) based on the switch positions, thereby providing a light show with sound effects.

Figure 4:
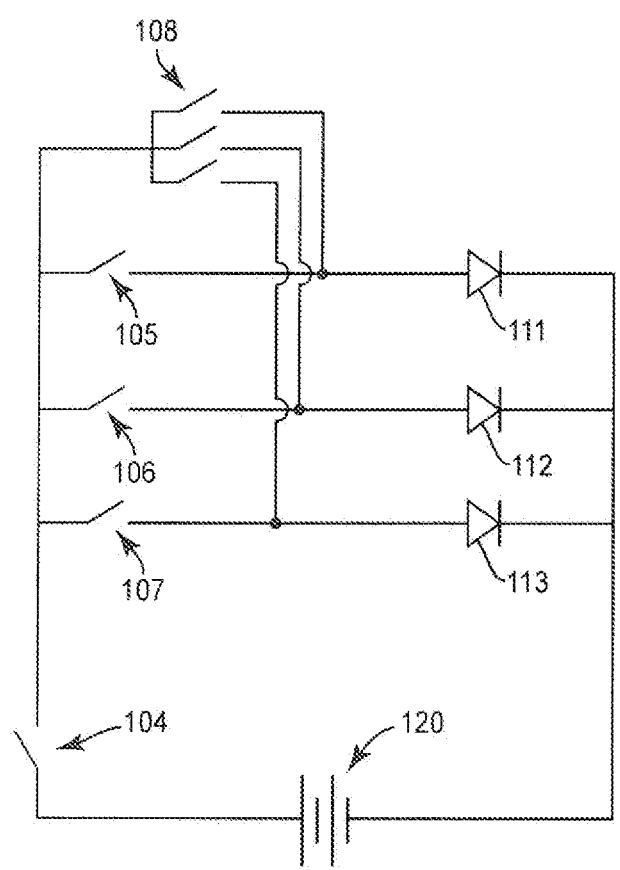
FIG. 4 is a circuit diagram of a color changing container apparatus according to the present disclosure.
Figure 5:
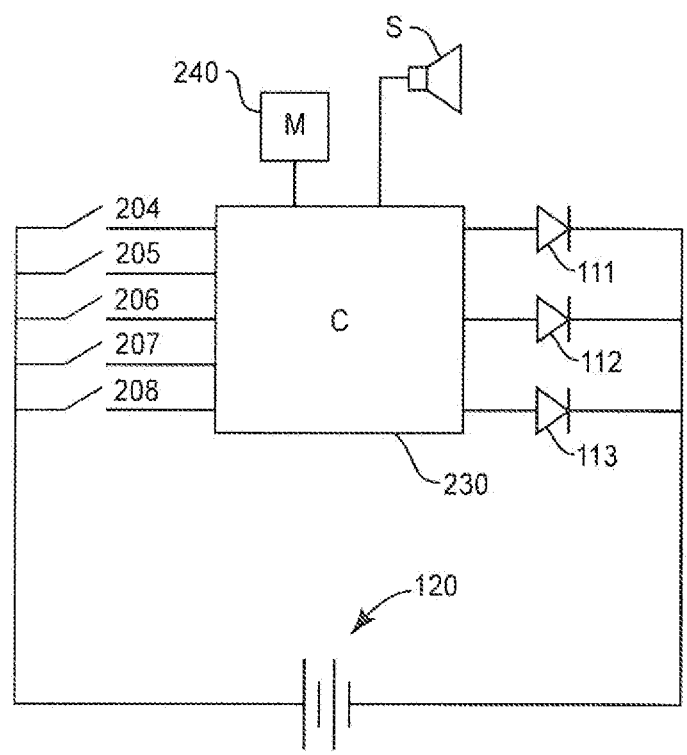
FIG. 5 is a circuit diagram of a color changing container apparatus according to the present disclosure.

Although the control of the lights in the color changing container apparatus 10 have been described with respect to the electrical configurations of FIGS. 4 and 5, other variations are contemplated to produce the lighting and/or sound effects described herein and variations thereof.

In addition, although the color changing container apparatus has been described herein to include the container and base, it is conceivable and contemplated by the present disclosure to illuminate a container without the need for a base. For example, a container can be manufactured with a light emitting device, battery and switch attached to or even molded within the container itself. The switch can be accessible to a user to operate the light emitting device. Other electronic components if included in the embodiment, for example a controller and/or speaker, can also be attached to and/or molded within the container without the need for the base. Thus, in any embodiment or variations thereof, the container, and its contents if included, can be illuminated by the at least one light emitting device to take on the color(s) emitted by the light emitting device.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

Where this application has listed the steps of a method or procedure in a specific order, it may be possible, or even expedient in certain circumstances, to change the order in which some steps are performed, and it is intended that the particular steps of the method or procedure claim set forth herein below not be construed as being order-specific unless such order specificity is expressly stated in the claim.

While the preferred embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims.

What is claimed is:

1. A color changing container apparatus, comprising:
   a container having an open top, a bottom and a side, and constructed from a material such that substantially all of the container transmits light there-through; and
   at least one light emitting device attachable to the container to direct light through the container when the container is connected to the at least one light emitting device and providing at least one light color to illuminate the container; and
   a cover attachable to the top of the container.

2. The color changing container apparatus of claim 1, further comprising:
   at least one switch electrically connected to the light emitting device for controlling the light emitting device.

3. The color changing container apparatus of claim 2, further comprising:
   a controller connected to the at least one light emitting device and the at least one switch for controlling the at least one light emitting device according to an input received from at least one switch.

4. The color changing container apparatus of claim 1, wherein the at least one light emitting device is a multi-color light emitting device.

5. The color changing container apparatus of claim 1 wherein the at least one light emitting device is a light emitting diode (LED).

6. The color changing container apparatus of claim 1 wherein said container is formed in the shape of a mug.

7. The color changing container apparatus of claim 1 wherein the container is fabricated from a material selected from the group consisting of high density polyethylene plastic, ultra high molecular weight polyethylene plastic, MC cast nylon 6/66 plastic, polytetrafluoroethylene plastic, acrylonitrile butadiene styrene, polycarbonate, polyamide, polybutylene terephthalate, polyethylene terephthalate, polyphenylene oxide, polysulphone, polyetherketone, polyetheretherketone, polyimides, polyphenylene sulfide and polyoxymethylene plastic.

8. The color changing container apparatus of claim 1 wherein the container is fabricated from glass.

9. A color changing container apparatus, comprising:
   a container having an open top, a bottom and a side, and constructed from a material such that substantially all of the container transmits light there-through;
   a base attachable to the bottom of the container, comprising:
       at least one light emitting device positioned to direct light through the bottom of the container when the container is connected to the base and providing a plurality of user selectable colors; and
       a plurality of switches for selecting a desired color; and
   a cover attachable to the top of the container.

10. The color changing container apparatus of claim 9, further comprising:
    a controller connected to the at least one light emitting device and the plurality of switches for controlling the at least one light emitting device according to inputs received from at least one switch.

11. The color changing container apparatus of claim 10 wherein the controller is connected to a speaker to provide sound effects.

12. The color changing container apparatus of claim 9 wherein the at least one light emitting device comprise at least one light emitting diode for each of the plurality of user selectable colors.

13. The color changing container apparatus of claim 9 wherein the plurality of switches includes at least one switch for a respective one of each of the desired colors.

14. The color changing container apparatus of claim 9 wherein the switches are disposed on a lateral side of the container.

15. The color changing container apparatus of claim 9 wherein the at least one light emitting device is positioned in an interior space of the container.

16. A color changing container apparatus, comprising:
    a container having an open top, a bottom and a side, and constructed from a material such that substantially all of the container transmits light there-through;
    a base attachable to the bottom of the container, comprising:
        a plurality of light emitting devices positioned to direct light from the light emitting devices through the bottom of the container when the container is connected to the base and providing a plurality of user selectable colors; and
        a plurality of switches for selecting a desired color;
    a controller connected to the plurality of light emitting devices and the plurality of switches for controlling the at least one light emitting device according to inputs received from the plurality of switches; and
    a cover attachable to the too of the container.

17. The color changing container apparatus of claim 16 wherein the controller is connected to a speaker to provide sound effects.

18. The color changing container apparatus of claim 16, wherein the controller can activate more than one light emitting device.

19. The color changing container apparatus of claim 16, wherein the plurality of light emitting devices are light emitting diodes (LEDs).

* * * * *